(12) United States Patent
Inoue

(10) Patent No.: US 7,332,018 B2
(45) Date of Patent: Feb. 19, 2008

(54) DEAERATOR, LIQUID EJECTING DEVICE, AND INKJET RECORDING APPARATUS

(75) Inventor: Hiroshi Inoue, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 416 days.

(21) Appl. No.: 11/042,110

(22) Filed: Jan. 26, 2005

(65) Prior Publication Data

US 2005/0178271 A1    Aug. 18, 2005

(30) Foreign Application Priority Data

Jan. 26, 2004   (JP)   ............................. 2004-017249

(51) Int. Cl.
*B01D 19/00*   (2006.01)
(52) U.S. Cl. .................... 96/6; 96/156; 96/193; 347/92
(58) Field of Classification Search ...................... 96/6, 96/156, 193; 95/46, 266; 347/92
See application file for complete search history.

(56) References Cited

FOREIGN PATENT DOCUMENTS

| JP | 8-207048 A | 8/1996 |
|---|---|---|
| JP | 11-28307 | 2/1999 |
| JP | 11-028307 | * 2/1999 |
| JP | 2002-307706 A | 10/2002 |
| JP | 2003-341083 | 12/2003 |

OTHER PUBLICATIONS

JPO machine translation of JP 11-028307 A detailed description pp. 1-5.*

* cited by examiner

*Primary Examiner*—Duane Smith
*Assistant Examiner*—Douglas J. Theisen
(74) *Attorney, Agent, or Firm*—Birch, Stewart, Kolasch & Birch, LLP

(57) ABSTRACT

The deaerator for liquid, comprises: a flow path in which the liquid flows; a pressure reducing deaerating device which removes dissolved gas contained in the liquid inside the flow path by reducing pressure of a deaerating section surrounding at least a portion of the flow path; and a variation device which varies a length of the flow path inside the deaerating section.

9 Claims, 8 Drawing Sheets

DEAERATOR, LIQUID EJECTING DEVICE, AND INKJET RECORDING APPARATUS

BACKGROUND OF THE INVENTION

1. Field of the Invention

The present invention relates to a deaerator, a liquid ejecting device, and an inkjet recording apparatus, and more specifically to a technology for eliminating air bubbles from a liquid, by removing gas from a liquid containing dissolved gas such as ink used in an inkjet printer.

2. Description of the Related Art

In recent years, inkjet printers have come to be used widely as data output apparatuses for outputting images, documents, or the like. An inkjet printer forms data on recording paper by driving recording elements (nozzles) of a recording head in accordance with data, thereby causing ink to be ejected from the nozzles. Ejecting devices for causing ejection of the ink include devices using PZT actuators (piezoelectric elements), or the like, which apply a pressure wave to a pressure chamber connected to a nozzle, and devices using a heat source which heats ink contained in an ink chamber (pressure chamber) and thereby generates bubbles in the ink. Ink pressurized by operating ejecting devices of this kind is ejected from the nozzles and data, such as an image, is formed on a recording medium.

In an inkjet printer, if air bubbles become mixed into the ink inside the recording head, then they can cause ejection abnormalities. For example, in a system using PZT actuators to drive the recording elements, if air bubbles become mixed into the pressure chambers where the ejection energy is generated, then the pressure applied to the ink inside the pressure chambers by the PZT actuators declines and it becomes impossible to eject ink of the prescribed quantity. Moreover, in a system using a heat source to generate a bubble by heating the ink inside the ink chambers (pressure chambers), air bubbles can affect the amount of ink ejected, the direction of ejection, the speed of ejection, and the like, and as a result, variations in the ejection performance occur.

The ejection abnormalities and variations in ejection performance described above cause deterioration in the quality of the recorded image. Therefore, it is desirable that as little gas as possible is dissolved in the ink that is supplied to the recording head, and hence a deaerating mechanism (deaerator) is used in order to remove the dissolved gas from the ink.

In one example of a deaerating mechanism, a configuration is adopted in which dissolved gas is removed from ink by passing the ink through a porous hollow fiber filter and reducing the pressure in the space surrounding the hollow fiber filter.

In the resin supply apparatus disclosed in Japanese Patent Application Publication No. 8-207048, a first chamber and a second chamber divided by a shutter are arranged between the pellet input opening and the ejection outlet of a plastic extrusion molding device. By controlling the shutter, the first chamber and the second chamber can be connected or hermetically sealed, freely.

Furthermore, Japanese Patent Application Publication No. 2002-307706 discloses an apparatus and a method for replenishing ink into an ink container, which is provided with an ink tank for accumulating deaerated ink and two circulatory paths comprising a deaerating unit. The deaerating units are arranged in the circulatory paths and if the amount of gas contained in the ink is equal to or less than a prescribed value, then the flow path is changed.

However, there is a difference in the frequency of ink consumption (the amount of ink consumed per unit time) in a case where an image is printed and a case where a document is printed. In the case of low-duty operation, namely, intermittent printing such as document printing, the ink is held inside the deaerator for a sufficiently long period of time and therefore suitable deaeration can be performed. On the other hand, in the case of high-duty operation, namely, continuous printing such as image printing, a large amount of ink is consumed per unit time and the time that the ink is held in the deaerator becomes shorter, so that deaeration may not be carried out adequately. Conventionally, the deaeration process is hence optimized in accordance with continuous printing (for example, the length of the flow path inside the deaerator is set to a length that suits continuous printing), and the process is not optimized for intermittent printing.

For the reason described above, during low-duty operation, there is a concern that excessive deaeration may be performed, since even ink that is not required is deaerated. If the ink is deaerated more than is necessary, the solvent in the ink declines and the viscosity of the ink may increase.

In the resin supply apparatus disclosed in Japanese Patent Application Publication No. 8-207048, the shutter simply functions as an opening and closing mechanism between the first chamber and second chamber, and the opening or closing of the shutter does not serve to alter the range of deaeration.

Furthermore, in the apparatus and method for replenishing ink in an ink container disclosed in Japanese Patent Application Publication No. 2002-307706, since the amount of ink in the circulatory paths is large, deaeration takes a long time, degradation of the ink component occurs due to deaerating the ink more than necessary, and hence there is a concern regarding excessive deaeration.

SUMMARY OF THE INVENTION

The present invention has been contrived in view of such circumstances, and an object thereof is to provide a deaerator, a liquid ejecting device and an inkjet recording apparatus, whereby gas dissolved in liquid droplets can be eliminated in accordance with the frequency of consumption of the liquid droplets.

In order to attain the aforementioned object, the present invention is directed to a deaerator for liquid, comprising: a flow path in which the liquid flows; a pressure reducing deaerating device which removes dissolved gas contained in the liquid inside the flow path by reducing pressure of a deaerating section surrounding at least a portion of the flow path; and a variation device which varies a length of the flow path inside the deaerating section.

According to the present invention, the length of the flow path inside the deaerating section can be changed by means of the variation device, it is thereby possible to adjust the deaeration capacity by changing the length of the flow path inside the deaerating section in accordance with requirements. Moreover, by reducing the pressure inside the deaerating section, dissolved gas contained in the liquid flowing along the flow path inside the deaerating section is removed. Consequently, the flow path contains liquid that has not been deaerated, at the upstream side of the deaerating section, and the flow path contains liquid that has been deaerated, at the downstream side of the deaerating section.

The liquid may be a liquid chemical, a processing liquid, ink, or the like.

Furthermore, the member used for the flow path is a member that allows the gas contained in the liquid to be extracted to the outside of the flow path, when the pressure outside the flow path is reduced while the liquid is present in the flow path.

The pressure reducing deaerating device may be a device which reduces the pressure inside the deaerating section by means of a vacuum pump or other pressure reducing device, in such a manner that the dissolved air is extracted through the flow path containing a gas-porous hollow fiber filter, or the like.

Preferably, the variation device changes the length of the flow path inside the deaerating section by changing an effective region of the deaerating section. According to this, the length of the flow path inside the deaerating section is varied by changing the effective region of the deaerating section, and it is thereby possible to change the length of the flow path that is subjected to deaeration, by means of a simple composition.

Preferably, the deaerator further comprises a control device which performs control so that an effective region of the deaerating section is enlarged in such a manner that the length of the flow path inside the deaerating section becomes relatively longer when a use frequency of the deaerated liquid is relatively high, and the effective region of the deaerating section is reduced in such a manner that the length of the flow path inside deaerating section becomes relatively shorter when the use frequency of the deaerated liquid is relatively low.

According to the present invention, suitable deaeration processing can be achieved in accordance with the frequency of use of the liquid to be deaerated, by lengthening the flow path inside the deaerating section when the use frequency of the deaerated liquid is high, and shortening the flow path inside the deaerating section when the use frequency of the deaerated liquid is low. In other words, the deaerator can be optimized in accordance with the use frequency of the liquid that is to be deaerated.

For example, when deaerating liquid that is supplied to an ejection head for ejecting droplets of the liquid, the length of the flow path in the deaerating section should be changed in accordance with the frequency of operation of the ejection head. At maximum ejection frequency (approximately 100% of the operating duty), the amount of liquid deaerated per unit time is set to a maximum by setting the length of the flow path to a maximum. When the ejection frequency is approximately ½ of the maximum (approximately 50% of the operating duty), the length of the flow path is set to approximately ½ of the length at maximum ejection frequency.

Preferably, the deaerator further comprises a dividing member which divides the deaerating section into a plurality of chambers, the dividing member having a flow path switching device which switches a flow of the liquid so as to change the flow path formed inside the deaerating section and thereby causes the length of the flow path inside the deaerating section to vary. According to this, it is possible to change the length of the flow path in the deaerating section in unit lengths corresponding to the length of the flow path in each respective chamber.

The chambers may be of substantially the same size, or they may be of different sizes.

Preferably, the flow path inside the deaerating section has a structure in which a supply flow path entering from an inlet of the deaerating section turns back and changes to a return flow path which returns to a side of the inlet; the dividing member comprises connecting pipes which connect the supply flow paths and the return flow paths, respectively, of the chambers divided by the dividing member, and a turn back pipe which connects the supply flow path and the return flow path inside the same chamber; and the control device performs control so that the length of the flow path inside the deaerating section is varied through switching between the connecting pipes and the turn back pipe, by moving the dividing member.

According to the present invention, by selecting the connecting pipes, mutually adjoining chambers are connected by means of the connecting pipes and the length of the flow path inside the deaerating section can be increased. On the other hand, by selecting the turn back pipe, the flow path is caused to turn back within the same chamber, and hence the length of the flow path inside the deaerating section can be shortened. Consequently, the connecting pipes should be selected when the use frequency of the deaerated liquid is high, and the turn back pipe should be selected when the use frequency of the deaerated liquid is low.

In other words, by providing at least two chambers and moving the dividing member forming the boundary between these chambers, it is possible to change between a connected state and an unconnected state.

Preferably, the dividing member has a connecting hole which connects the chambers divided by the dividing member; and the pressure reducing deaerating device reduces the pressure inside the chambers connected through the connecting hole when the connecting pipes are set in position by movement of the dividing member. According to this, if the connecting pipes are selected by the movement of the dividing member and the chambers are connected together, then the pressure in the chambers connected through the connecting hole can be reduced by means of the common pressure reducing deaerating device. Hence, it is not necessary to provide a deaerating device at each chamber.

Preferably, the deaerator further comprises: an attaching and detaching device which attaches and detaches each of chambers arranged in the deaerating section, wherein the length of the flow path inside the deaerating section is varied by increasing or decreasing a number of the chambers by the attaching and detaching device. According to this, the chambers are composed in a detachable fashion, and it is possible to increase or decrease the number of chambers by means of the attaching and detaching device, and hence the number of chambers can be set in accordance with the required flow path length.

Preferably, the deaerator further comprises a movable wall which moves by sliding along the flow path contained in the deaerating section to vary the length of the flow path inside the deaerating section. According to this, a composition is adopted in which the length of the flow path inside the deaerating section is varied through changing the region of the deaerating section by moving the movable wall. It is thus possible to change the flow path inside the deaerating section to adjust the deaerating capacity of the deaerating device by means of a simple structure.

Preferably, the flow path contained inside the deaerating section comprises a supply flow path and a return flow path disposed substantially in parallel inside the deaerating section.

Moreover, in order to attain the aforementioned object, the present invention is also directed to a liquid ejecting device, comprising: an ejection head which ejects droplets of liquid onto an ejection receiving medium; a storing section which stores the liquid to be ejected from the ejection head; a flow path which supplies the liquid to the ejection head from the storing section; and the above-described deaerator which removes dissolved gas contained in the liquid inside the flow path.

According to the present invention, a composition is adopted in which the deaerating section inside the deaerator is changed in accordance with the ejection frequency of the deaerated liquid, and it is thus possible to supply liquid to the ejection head that has been deaerated to a suitable state in accordance with the ejection frequency.

The liquid ejecting device may also be a dispenser, coating device, or the like, which ejects a liquid, such as water, liquid chemical or processing liquid, through ejection outlets, onto an ejection receiving medium, such as paper, film or a wafer.

Furthermore, in order to attain the aforementioned object, the present invention is also directed to an inkjet recording apparatus, comprising: a recording head which ejects droplets of ink onto a recording medium; an ink storing section which stores the ink to be ejected from the recording head; an ink flow path which supplies the ink from the ink storing section to the recording head; and the deaerator as defined in claim 1 which removes dissolved gas contained in the ink inside the ink flow path.

According to the present invention, a composition is adopted in which the deaerating section of the deaerator is changed in accordance with the ink ejection frequency (ejection duty), and the ink that has been deaerated to a desirable state can be supplied to the recording head, both in high-duty operation and in low-duty operation. Furthermore, problems such as increased viscosity in the ink or decomposition of the ink pigment due to excessive deaeration, can be prevented.

According to the present invention, in a deaerator for removing dissolved gas from a liquid, a composition is adopted in which the length of the flow path inside the deaerating section contained in the pressure reducing deaerating device can be changed. Therefore, by changing the length of the flow path in accordance with the use frequency of the deaerated liquid, it is possible to optimize the deaeration amount per unit time. The present deaerator may be used in a liquid ejecting device or an inkjet recording apparatus.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

General Configuration of an Inkjet Recording Apparatus

Figure 1:
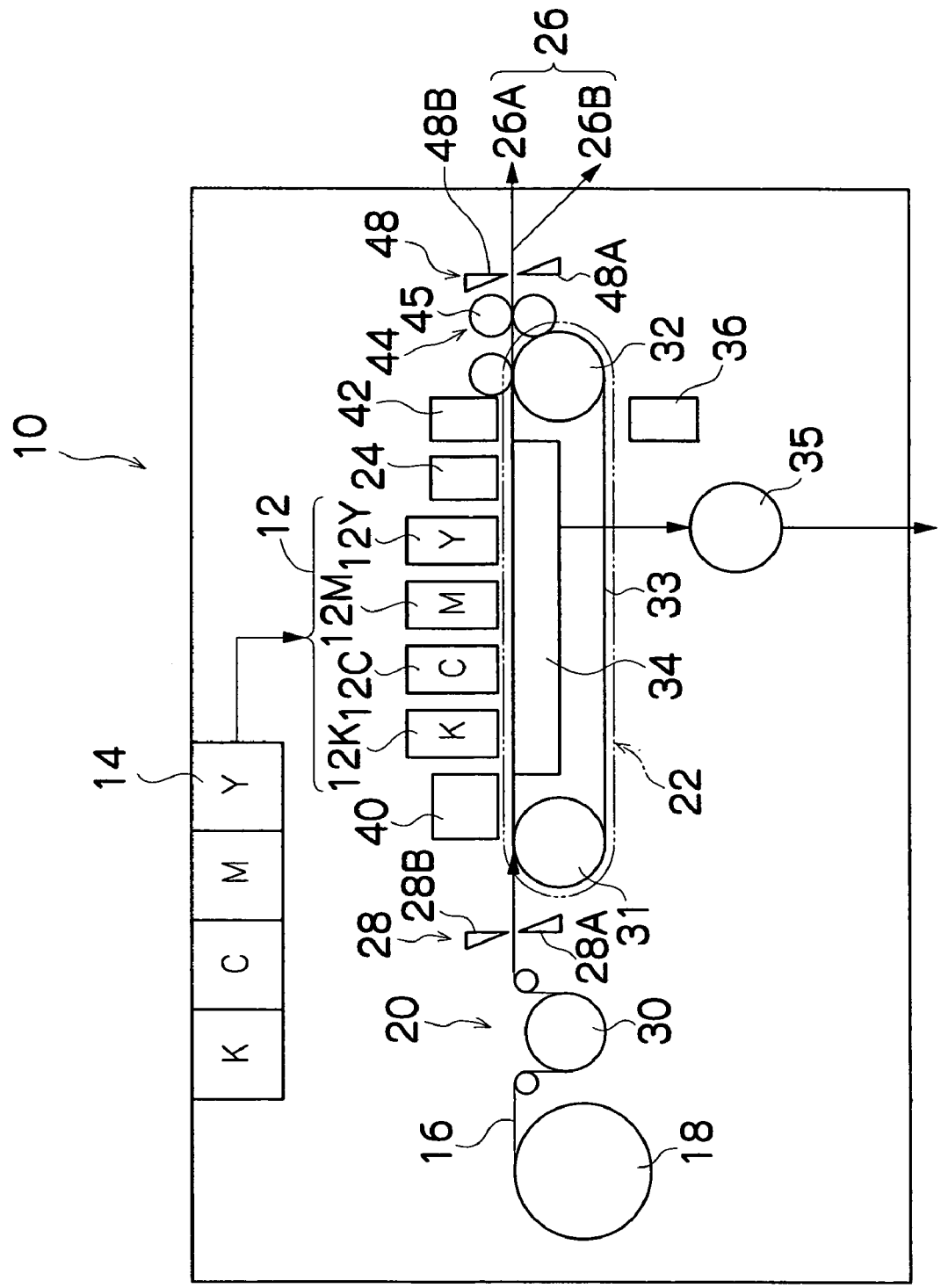
FIG. 1 is a general schematic drawing of an inkjet recording apparatus according to an embodiment of the present invention.

FIG. 1 is a general schematic drawing of an inkjet recording apparatus according to an embodiment of the present invention. As shown in FIG. 1, the inkjet recording apparatus 10 comprises: a printing unit 12 having a plurality of print heads 12K, 12C, 12M, and 12Y for ink colors of black (K), cyan (C), magenta (M), and yellow (Y), respectively; an ink storing and loading unit 14 for storing inks of K, C, M and Y to be supplied to the print heads 12K, 12C, 12M, and 12Y; a paper supply unit 18 for supplying recording paper 16; a decurling unit 20 removing curl in the recording paper 16 supplied from the paper supply unit 18; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the printing unit 12; and a paper output unit 26 for outputting image-printed recording paper (printed matter) to the exterior.

In FIG. 1, a magazine for rolled paper (continuous paper) is shown as an example of the paper supply unit 18; however, more magazines with paper differences such as paper width and quality may be jointly provided. Moreover, paper may be supplied with a cassette that contains cut paper loaded in layers and that is used jointly or in lieu of the magazine for rolled paper.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

In the case of the configuration in which roll paper is used, a cutter (a first cutter) 28 is provided as shown in FIG. 1, and the continuous paper is cut into a desired size by the cutter 28. The cutter 28 has a stationary blade 28A, of which length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut paper is used, the cutter 28 is not required.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and the suction chamber 34 provides suction with a fan 35 to generate a negative pressure, and the recording paper 16 is held on the belt 33 by suction.

The belt 33 is driven in the clockwise direction in FIG. 1 by the motive force of a motor (not shown in FIG. 1, but shown as a motor 88 in FIG. 3) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the line velocity of the cleaning roller different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

The printing unit 12 forms a so-called full-line head in which a line head having a length that corresponds to the maximum paper width is disposed in the main scanning direction perpendicular to the delivering direction of the recording paper 16. Each of the print heads 12K, 12C, 12M, and 12Y is composed of a line head, in which a plurality of ink-droplet ejection apertures (nozzles) are arranged along a length that exceeds at least one side of the maximum-size recording paper 16 intended for use in the inkjet recording apparatus 10.

The print heads 12K, 12C, 12M, and 12Y are arranged in the order of black (K), cyan (C), magenta (M), and yellow (Y) from the upstream side (the left-hand side in FIG. 1) along the delivering direction of the recording paper 16 (hereinafter referred to as the paper conveyance direction). A color print can be formed on the recording paper 16 by ejecting the inks from the print heads 12K, 12C, 12M, and 12Y, respectively, onto the recording paper 16 while conveying the recording paper 16.

Although the configuration with the KCMY four standard colors is described in the present embodiment, combinations of the ink colors and the number of colors are not limited to those, and light and/or dark inks can be added as required. For example, a configuration of six colors is possible in which print heads for ejecting light-colored inks such as light cyan and light magenta are added, and a configuration of seven colors is possible in which print head for ejecting dark yellow ink is added to the configuration of six colors.

The print unit 12, in which the full-line heads covering the entire width of the paper are thus provided for the respective ink colors, can record an image over the entire surface of the recording paper 16 by performing the action of moving the recording paper 16 and the print unit 12 relatively to each other in the paper conveyance direction just once (i.e., with a single scanning to the paper conveyance direction). Higher-speed printing is thereby made possible and productivity can be improved in comparison with a serial (a shuttle scan) type head configuration in which a print head reciprocates in the main scanning direction.

As shown in FIG. 1, the ink storing and loading unit 14 has tanks (shown in FIG. 2 as a tank 60) for storing the inks of K, C, M and Y to be supplied to the print heads 12K, 12C, 12M, and 12Y, and the tanks for the respective colors are connected to the print heads 12K, 12C, 12M, and 12Y through channels (not shown), respectively. Each of the ink supply paths from the ink tanks to the print heads 12K, 12C, 12M and 12Y is provided with a deaerator 62 for eliminating air bubbles and dissolved air contained in the ink supplied to the print heads 12K, 12C, 12M and 12Y, and a dissolved oxygen meter 63 for measuring the amount of air dissolved in the ink (see FIG. 2). In the inkjet recording apparatus 10, since air bubbles and dissolved air are removed from the ink by the operation of the deaerator 62, the ink supplied to the print heads 12K, 12C, 12M and 12Y is deaerated ink having a dissolved air content within a prescribed range.

The ink storing and loading unit 14 has a warning device (e.g., a display device, an alarm sound generator) for warning when the remaining amount of any ink is low, and has a mechanism for preventing loading errors among the colors.

The print determination unit 24 has an image sensor for capturing an image of the ink-droplet deposition result of the print unit 12, and functions as a device to check for ejection defects such as clogs of the nozzles in the print unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements that are arranged two-dimensionally.

The print determination unit 24 reads a test pattern or the target image printed with the print heads 12K, 12C, 12M, and 12Y for the respective colors, and the ejection of each head is determined. The ejection determination includes the presence of the ejection, measurement of the dot size, and measurement of the dot deposition position. The print determination unit 24 is provided with a light source (not shown) to illuminate the dots deposited on the recording paper 16.

A post-drying unit 42 is disposed following the print determination unit 24. The post-drying unit 42 is a device to dry the printed image surface, and includes a heating fan, for example. It is preferable to avoid contact with the printed surface until the printed ink dries, and device which blows heated air onto the printed surface is preferable.

In cases in which printing is performed with dye-based ink on porous paper, blocking the pores of the paper by the application of pressure prevents the ink from coming contact with zone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathway in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, the paper output unit 26A for the target prints is provided with a sorter for collecting prints according to print orders. Furthermore, a numeral 26B is test-printed paper output unit.

In the print unit 12, each of the print heads 12K, 12C, 12M, and 12Y is a full-line head in which one or more of nozzle rows in which a plurality of ink ejection nozzles are arranged along a length corresponding to the entire width of the recording medium in the direction substantially perpendicular to the conveyance direction of the recording medium.

Thus, each of the print heads 12K, 12C, 12M, and 12Y has a structure in which a plurality of nozzles for ejecting ink-droplets are two-dimensionally disposed in the form of a staggered matrix, and the effective nozzle distance as projected in the head lengthwise direction is thereby made small.

Alternatively, a full-line head can be composed of a plurality of short two-dimensionally arrayed heads arranged in the form of a staggered matrix and combined so as to form nozzle rows having a length that corresponds to the total width of the recording medium.

The inkjet recording apparatus 10 employs a method where an ejection pressure is applied to ink inside a pressure chamber connected to a nozzle by causing the volume of the pressure chamber to change. By means of this ejection pressure, ink inside the pressure chamber is ejected.

An actuator, such as a piezoelectric element, is used as the source of the ink ejection force. The actuator is installed on a vibration plate forming one wall (the ceiling) of the pressure chamber, and when the vibration plate is deformed by driving the actuator, the volume of the pressure chamber changes, and hence an amount of ink corresponding to this change in the volume of the pressure chamber is ejected.

When ink ejection is performed, new ink is supplied to the pressure chamber from a supply system that includes a common flow path connected to the pressure chamber.

An actuator other than a piezoelectric element may be used as the actuator for applying an ejection force to the ink.

The ink ejection method is not limited to that described above. For instance, a thermal ejection method may also be adopted, in which a heat source is arranged inside the ink chamber (which corresponds to the pressure chamber), an air bubble is generated inside the ink chamber by driving the heat source, and ink inside the ink chamber is ejected by means of the energy created by this air bubble.

Figure 2:
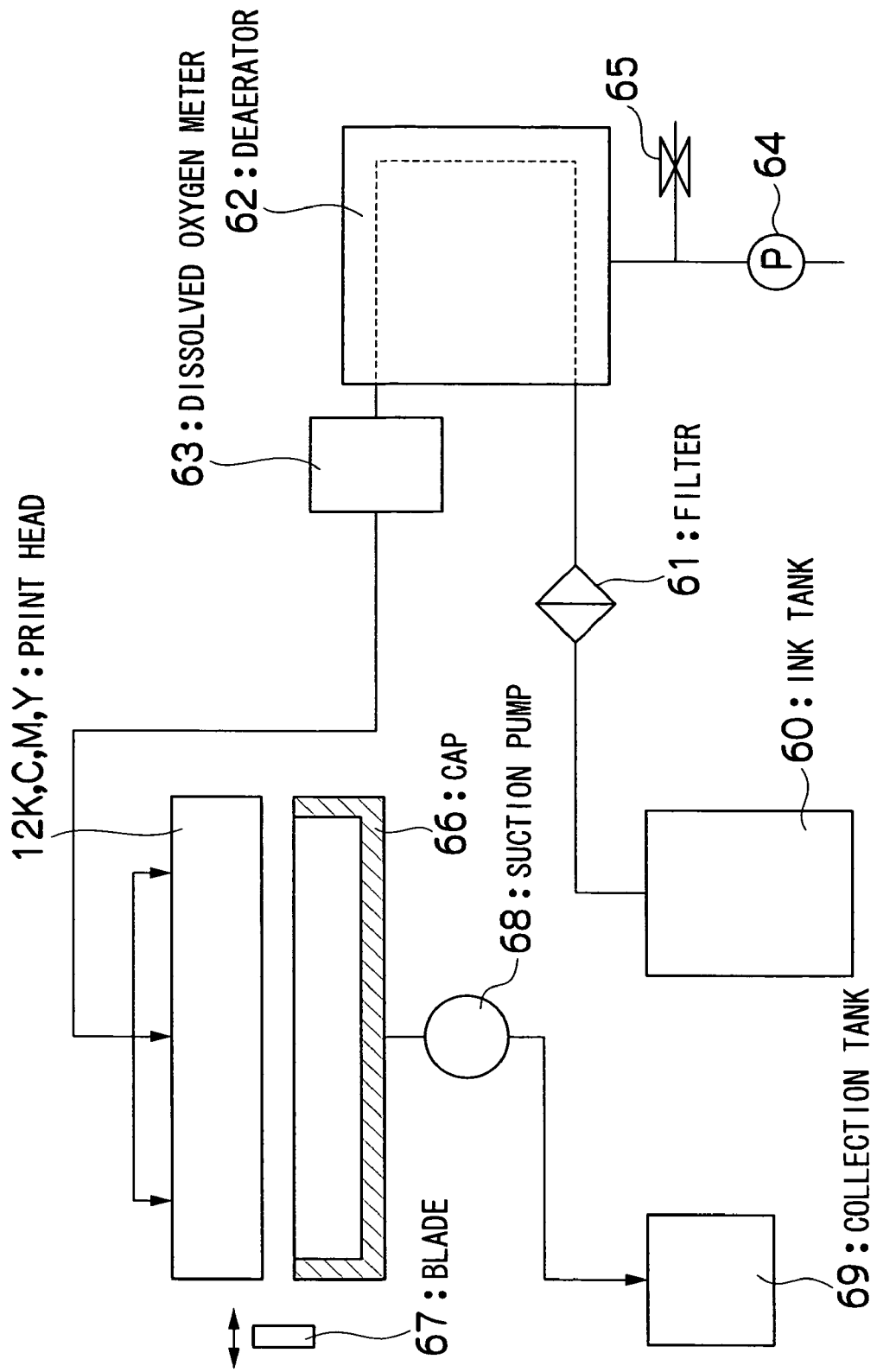
FIG. 2 is a schematic drawing showing a configuration of an ink supply system in the inkjet recording apparatus.

Next, the ink storing and loading unit 14 (the ink supply system) comprised in the inkjet recording apparatus 10 is described particularly with reference to FIG. 2. FIG. 2 is a schematic drawing showing the configuration of the ink supply system in the inkjet recording apparatus 10.

The ink tank 60 is a base tank that supplies ink and is set in the ink storing and loading unit 14 described with reference to FIG. 1. The aspects of the ink tank 60 include a refillable type and a cartridge type: when the remaining amount of ink is low, the ink tank 60 of the refillable type is filled with ink through a filling port (not shown) and the ink tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type. The ink tank 60 in FIG. 2 is equivalent to the ink storing and loading unit 14 in FIG. 1 described above.

As shown in FIG. 2, a filter 61 for removing foreign material and air bubbles, the deaerator 62 for eliminating dissolved air in the ink, and the dissolved oxygen meter 63, which functions as a monitor of the amount of air dissolved in the ink, are arranged between the ink supply tank 60 and the print heads 12K, 12C, 12M and 12Y. Furthermore, a pump 64 for reducing the pressure of the deaerating section inside the deaerator 62 and an external air valve 65 are arranged in the deaerator 62.

The filter mesh size in the filter 61 is preferably equivalent to or less than the diameter of the nozzle and commonly about 20 μm.

As described in detail below, the deaerator 62 has a deaeration amount adjusting function for adjusting the deaeration amount in accordance with requirements, by altering the deaerating section.

Although not shown in FIG. 2, it is preferable to provide a sub-tank integrally to the print heads 12K, 12C, 12M, and 12Y or nearby the print heads 12K, 12C, 12M, and 12Y. The sub-tank has a damper function for preventing variation in the internal pressure of the head and a function for improving refilling of the print head.

Possible modes for controlling the internal pressure by means of the sub-tank include: a mode where the internal pressure of the ink chamber unit is controlled by the differential in the ink level between a sub-tank which is open to the external air and the ink chamber units inside the print heads 12K, 12C, 12M and 12Y; and a mode where the internal pressure of the sub-tank and the ink chambers is controlled by a pump connected to a sealed sub-tank; and the like. Any of these modes may be adopted.

The inkjet recording apparatus 10 is also provided with a cap 66 as a device to prevent the nozzles from drying out or to prevent an increase in the ink viscosity in the vicinity of the nozzles, and a cleaning blade 67 as a device to clean the nozzle face.

A maintenance unit including the cap 66 and the cleaning blade 67 can be relatively moved with respect to the print heads 12K, 12C, 12M, and 12Y by a movement mechanism (not shown), and is moved from a predetermined holding position to a maintenance position below the print heads 12K, 12C, 12M, and 12Y as required.

The cap 66 is displaced up and down relatively with respect to the print heads 12K, 12C, 12M, and 12Y by an elevator mechanism (not shown). When the power of the inkjet recording apparatus 10 is switched OFF or when in a print standby state, the cap 66 is raised to a predetermined elevated position so as to come into close contact with the print heads 12K, 12C, 12M, and 12Y, and the nozzle face (the ink ejection face) is thereby covered with the cap 66.

During printing or standby, when the frequency of use of specific nozzles is reduced and a state in which ink is not ejected continues for a certain amount of time or longer, the ink solvent in the vicinity of the nozzle evaporates and ink viscosity increases. In such a state, ink can no longer be ejected from the nozzle even if the actuator is operated.

Before reaching such a state the actuator is operated (in a viscosity range that allows ejection by the operation of the actuator), and a preliminary ejection (purge, air ejection, liquid ejection, dummy ejection) is made toward the cap 66 (ink receptor) to which the degraded ink (ink of which viscosity has increased in the vicinity of the nozzle) is to be ejected.

In addition, when initially loaded into the head, or when service has started after a long period of being stopped, degraded ink of which viscosity has increased (hardened) is suctioned.

The cap 66 is placed on the print heads 12K, 12C, 12M, and 12Y in this suction action, ink (ink in which bubbles have become intermixed) inside the pressure chamber 52 is removed by suction with a suction pump 68, and the suction-removed ink is sent to a collection tank 69.

The above-described suction action is performed with respect to all the ink in the pressure chamber 52, so that the amount of ink consumption is considerable. Therefore, a preferred aspect is one in which a preliminary ejection is performed when the increase in the viscosity of the ink is small.

The cleaning blade 67 is composed of rubber or another elastic member, and can slide on the ink ejection surface (surface of the nozzle plate) of the print heads 12K, 12C, 12M, and 12Y by means of a blade movement mechanism (not shown). When the unwanted matter on the ink ejection surface is cleaned by the blade mechanism, a preliminary ejection is carried out in order to prevent the foreign matter from becoming mixed inside the nozzles by the cleaning blade 67.

Figure 3:
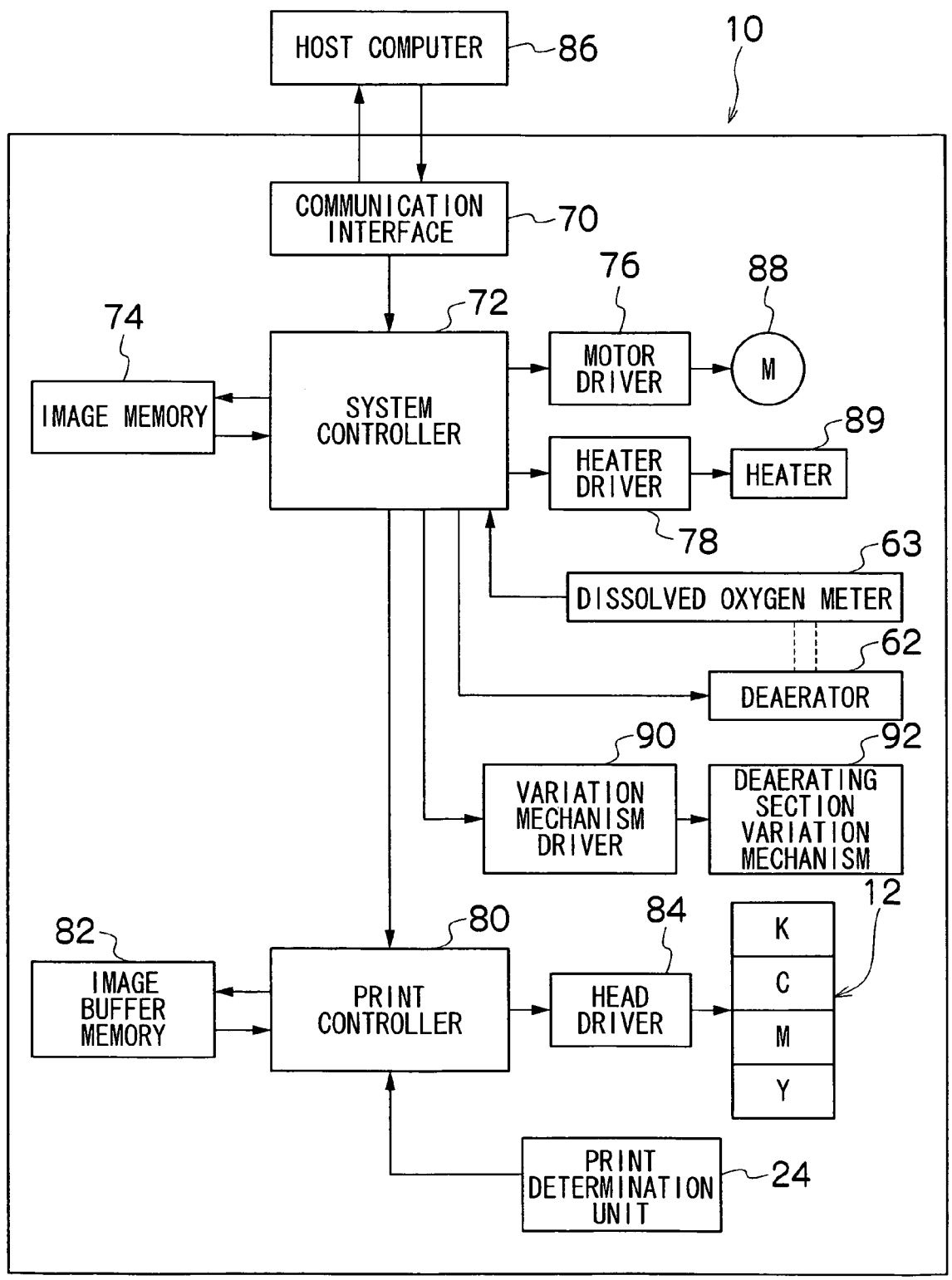
FIG. 3 is a principal block diagram showing the system composition of the inkjet recording apparatus.

FIG. 3 is a block diagram of the principal components showing the system configuration of the inkjet recording apparatus 10. The inkjet recording apparatus 10 has a communication interface 70, a system controller 72, an image memory 74, a motor driver 76, a heater driver 78, a print controller 80, an image buffer memory 82, a head driver 84, and other components.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to memory composed of a semiconductor element, and a hard disk drive or another magnetic medium may be used.

The system controller 72 controls the communication interface 70, image memory 74, motor driver 76, heater driver 78, and other components. The system controller 72 has a central processing unit (CPU), peripheral circuits therefor, and the like. The system controller 72 controls communication between itself and the host computer 86, controls reading and writing from and to the image memory 74, and performs other functions, and also generates control signals for controlling a heater 89 and the motor 88 in the conveyance system.

The motor driver (drive circuit) 76 drives the motor 88 in accordance with commands from the system controller 72. Furthermore, though the motor driver 76 and the motor 88 are described in FIG. 3, the system controller 72 controls a plurality of motor drivers and motors.

The heater driver (drive circuit) 78 drives the heater 89 of the post-drying unit 42 or the like in accordance with commands from the system controller 72.

The print control unit 80 is a control unit having a signal processing function for performing various treatment processes, corrections, and the like, in accordance with the control implemented by the system controller 72, in order to generate a signal for controlling printing, from the image data in the image memory 74, and it supplies the print control signal (image data) thus generated to the head driver 84. Prescribed signal processing is carried out in the print control unit 80, and the ejection amount and the ejection timing of the ink droplets from the respective print heads 12Y, 12C, 12M, and 12Y are controlled via the head drier 84, on the basis of the image data. By this means, prescribed dot size and dot positions can be achieved.

The print controller 80 is provided with the image buffer memory 82; and image data, parameters, and other data are temporarily stored in the image buffer memory 82 when image data is processed in the print controller 80. The aspect shown in FIG. 3 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives the actuators for the print heads 12K, 12C, 12M and 12Y of the respective colors on the basis of the print data received from the print controller 80. A feedback control system for keeping the drive conditions for the print heads constant may be included in the head driver 84.

The system controller 72 also controls the deaerator 62 shown in FIG. 2. The amount of air dissolved in the ink discharged from the deaerator 62 is measured by the dissolved oxygen meter 63, and the result of this measurement is sent to the system controller 72. In the system controller 72, the amount of air dissolved in the ink supplied from the dissolved oxygen meter 63 is monitored, and the deaerator 62 is controlled in such a manner that the amount of air dissolved in the ink lies within a prescribed range. The details of the control of the deaerator 62 are described hereafter.

In the system controller 72, on the other hand, the drive duty (drive frequency) of the print heads 12K, 12C, 12M and 12Y in a prescribed period of time is calculated oh the basis of print data supplied from the host computer 86. A command is supplied to a variation mechanism driver 90 in such a manner that the deaerating section inside the deaerator 62 illustrated in FIG. 2 can be changed, and a deaerating section variation mechanism 92 is driven in accordance with the variation mechanism driver 90.

Deaerator

The deaerator 62 illustrated in FIG. 2 is described below.

Figure 4:
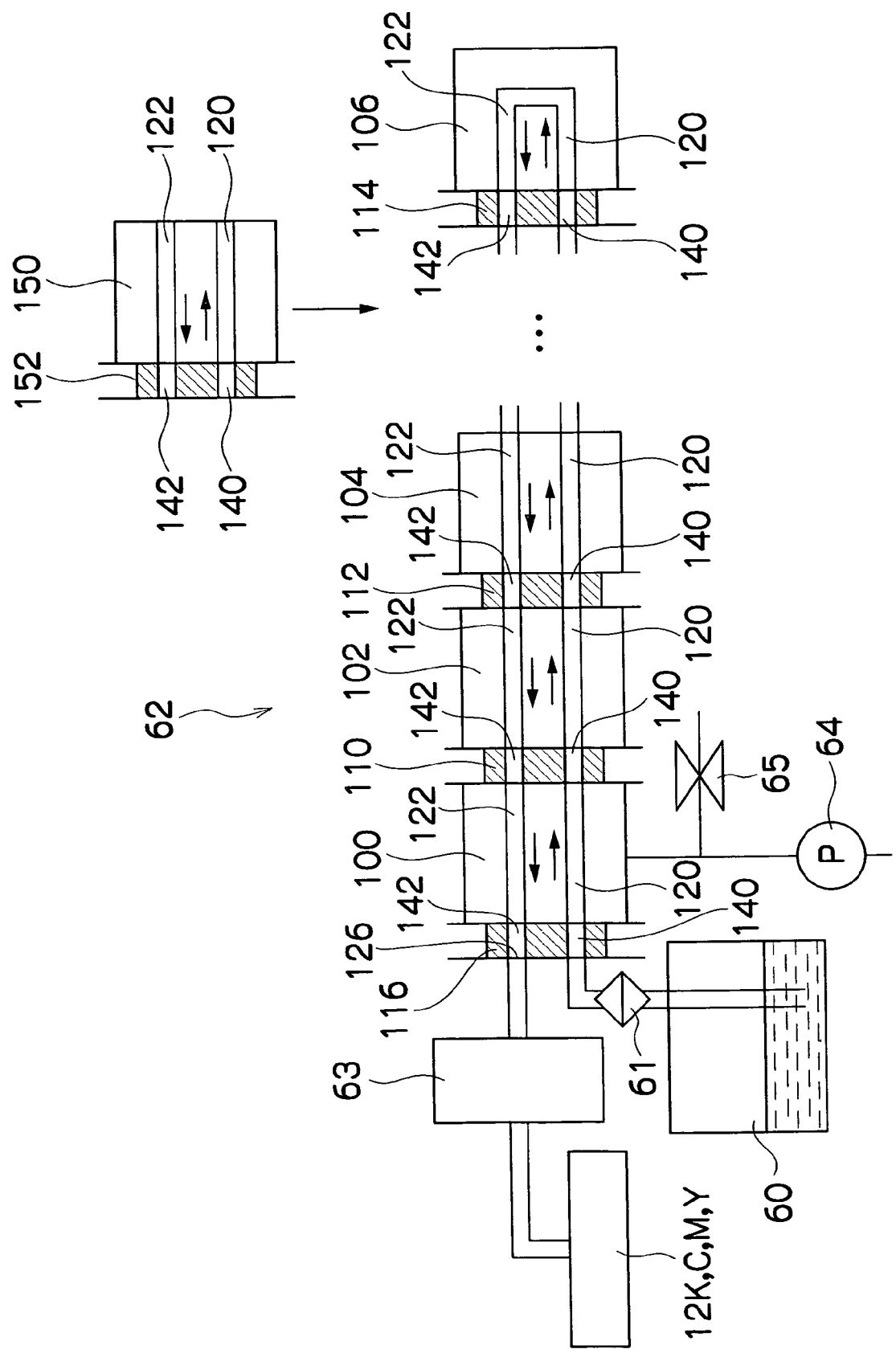
FIG. 4 is a general schematic drawing of the deaerator according to the present embodiment.

FIG. 4 is a general schematic drawing of the deaerator 62. In FIG. 4, items which are the same as or similar to those in FIG. 2 are denoted with the same reference numerals and description thereof is omitted here.

The deaerator 62 has a deaerating section where deaeration processing is carried out by using a pressure reducing device (pressure reducing deaerator) with the pump 64 shown in FIG. 2, or the like. The deaerating section is divided into a plurality of chambers 100, 102, 104 and 106, and movable walls 110, 112 and 114 for dividing the respective chambers are provided. A reference numeral 116 denotes a wall at the front end side (the ink input and output end) of the chambers. The movable walls dividing the chambers and the wall 116 at the front end side of the chambers have the same structure. Therefore, the movable wall 110 is described as a representative example of the movable walls 110, 112 and 114, and the wall 116.

The chambers are provided with supply flow paths 120, along which ink flows in from the ink tank 60, and return flow paths 122, along which the ink flows out to the print heads 12K, 12C, 12M and 12Y. The supply flow path 120 and the return flow path 122 form a U-turn structure inside the end chamber 106, where the two paths are connected together. The directions indicating by the arrows in FIG. 4 indicate the directions of flow of the ink.

As described in detail hereafter, the movable wall 110 comprises a connecting flow path 140 which connects together the respective supply flow paths 120 in the adjoining chambers, a connecting flow path 142 which connects the respective return flow paths 122 in the adjoining chambers, and a U-shaped path 160 (not shown in FIG. 4, and shown in FIG. 5) which connects the supply flow path 120 and the return flow path 122 in the same chamber. The movable wall 110 has a flow path switching device for performing switching in order to lengthen the flow path of the ink by connecting the connecting flow paths 140 and 142 to the supply flow paths 120 and the return flow paths 122, or alternatively, in order to restrict the flow path of the ink by connecting the U-shaped flow path 160 to the supply flow path 120 and the return flow path 122. Here, the wall 116 on the front end side of the chambers may be provided with the connecting flow paths 140 and 142 only.

Furthermore, the movable wall 110 is provided with a connecting hole 162 (not shown in FIG. 4, and shown in FIG. 5) for connecting the adjoining chambers. The pressure inside the plurality of chambers connected through the connecting holes can be controlled (the pressure can be reduced), by means of the pump 64 and the external air valve 65 connected to the chamber 100.

Furthermore, it is possible to increase the effective region of the deaerating section of the deaerator 62 to comply with the system by adding a chamber unit (for example, a unit 150 shown in FIG. 4). The chamber 150 is provided with a movable wall 152 having the same structure as the movable wall 110 to divide it from the adjoining chamber.

Thus, in the deaerator 62 shown in FIG. 4, the supply flow paths 120 and the return flow paths 122 in the chambers 100, 102, 104 and 106 are connected through the connecting flow paths 140 and 142 formed in the movable walls 110, 112 and 114. When ink is supplied to the deaerator 62 from the ink tank 60 through the filter 61, the ink passes along the supply flow paths 120 and the return flow paths 122 inside the chambers 100, 102, 104 and 106, and deaerated ink is discharged to the outside of the deaerator 62 from the emission outlet 126.

In order to remove the dissolved air contained in the ink, common known techniques, such as method described in the background of the invention, can be used in the deaerator 62. For example, it is possible to include a porous hollow fiber filter in the composition of the ink flow path inside the deaerator, in such a manner that the gas can be extracted through the hollow fiber filter by means of a pressure reducing deaerating device, such as a pump, or the like. Naturally, various other methods may also be adopted.

Figure 5:
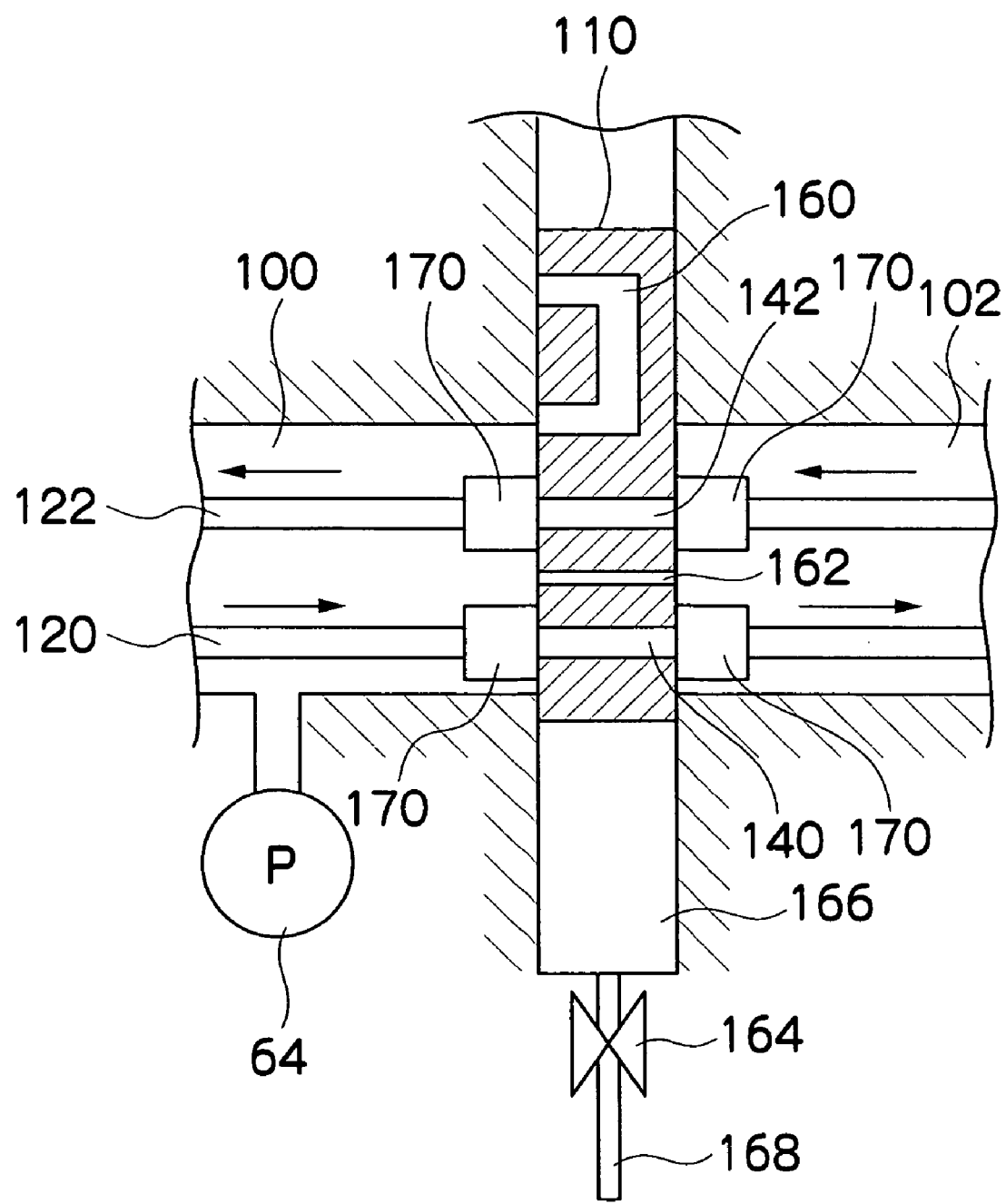
FIG. 5 is a structural diagram showing the detailed composition of a movable wall of a chamber provided in the deaerator in FIG. 4.
Figure 6:
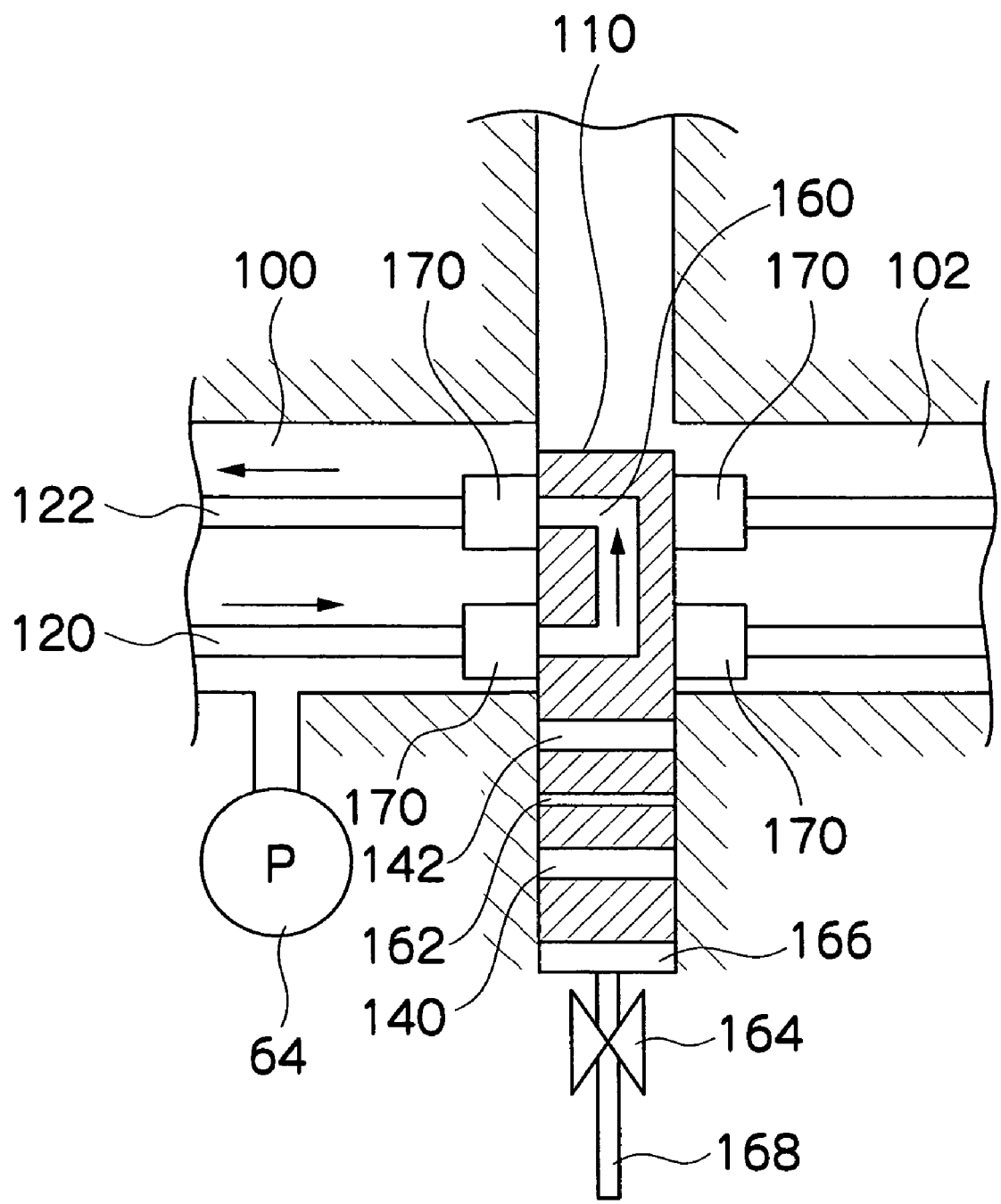
FIG. 6 is a diagram illustrating the operation of the movable wall in FIG. 5.

FIGS. 5 and 6 are side perspective diagrams of the chamber 100 and the surroundings showing the detailed structure of the movable wall 110. As described with reference to FIG. 4, the movable wall 110 is provided with the connecting flow paths 140 and 142, the U-shaped path 160, and the connecting hole 162. A movement region 166 is prepared for the movable wall 110 as the movement space for moving upwards and downwards. The ink accumulating in the movement region 166 is drained out through a draining valve 164 and a drain 168. Another structure may also be adopted in which FIG. 5 corresponds to a plan view (upper face) perspective diagram of the structure. In this case, the direction of movement of the movable wall 110 is the left/right direction as viewed from the upper face.

Moreover, at the boundaries of the paths inside the chamber with the movable wall 110, connecting sections 170 are arranged in order to maintain the sealing characteristics when the path inside the chamber is connected with the path inside the movable wall. The connecting sections 170 may comprise a packing or sealing material, or the like, and they may have a valve (non-reversing valve) structure.

Furthermore, the movable wall 110 is connected to the deaerating section variation mechanism 92 (not shown in FIG. 5, and shown in FIG. 3) for moving the movable wall 110 in the upward and downward directions. The deaerating section variation mechanism 92 includes a mechanical system such as a ball screw or linear guide, a motor (actuator), and a sensor, or the like, for determining the position of the movable wall 110.

FIG. 5 shows an example of a mode where the respective supply flow paths 120 and the respective return flow paths 122 in adjoining chambers (in this case, chamber 100 and chamber 102) are mutually connected.

FIG. 6 shows an example of another mode where the ink flow paths are caused to make a U-turn inside the movable wall 110. When the movable wall 110 is moved downwards from the state shown in FIG. 5, the supply flow path 120 and the return flow path 122 in the chamber 100 are connected to each other through the U-shaped flow path 160. Thus, the ink flowing in the supply flow path 120 of the chamber 100 flows through the U-shaped flow path 160 in the movable wall 110 and into the return flow path 122 in the chamber 100.

In this way, the flow paths of the ink inside the movable wall are switched by moving the movable wall arranged between the chambers, and by changing the number of chambers through which the ink passes, it is possible to change the size of the deaerating section (the length of the ink flow path inside the deaerating section).

Furthermore, in a mode where adjoining chambers are connected to each other as illustrated in FIG. 5, the pressure reduction regions of the connected chambers are linked through the connecting hole 162, and hence the pressure in the pressure reduction regions of the chambers provided with no pump can be reduced by the action of the pump (e.g., the pump 64 in FIG. 5) arranged at any one of the connected chambers.

In a mode where three or more chambers are connected, it is possible to reduce the pressure inside all of the chambers by means of one pump, depending on the capacity of the pump.

On the other hand, in a mode where adjoining chambers are not connected to each other as illustrated in FIG. 6, the connecting hole 162 is not used and the pressure reduction regions of the adjoining chambers are not connected together. Hence, pressure reduction is only performed in the chamber provided with the pump.

Control of Deaeration

Next, the control of deaeration in the deaerator 62 described above is explained.

The inkjet recording apparatus 10 is controlled in such a manner that ink having a desirable amount of dissolved air can be supplied to the print heads 12K, 12C, 12M and 12Y irrespective of ejection circumstances, by changing the deaerating section of the deaerator 62 in accordance with the amount of ink ejected from the print heads 12K, 12C, 12M and 12Y per unit time. In other words, the inkjet recording apparatus 10 is controlled in such a manner that a long deaerating section is formed when the ejection duty is high, and a short deaerating section is formed by creating a U-turn inside a movable wall when the ejection duty is low.

For example, if the ink ejection frequency is high, such as in image printing, or the like (so-called high-duty operation), then the amount of ink supplied to the print heads 12K, 12C, 12M and 12Y per unit time is large. Accordingly, the deaerating section is enlarged by connecting together a plurality of chambers, in such a manner that the amount of ink that can be deaerated per unit time is increased. On the other hand, if the ink ejection frequency is low, such as in document printing (low-duty operation), then the amount of ink supplied per unit time is only small, and hence the chambers are disconnected from each other in order to reduce the deaerating section. In other words, the deaerator 62 changes the deaerating section by reading in the print data and controlling the movable wall 110 accordingly.

Furthermore, the dissolved oxygen meter 63 for measuring the amount of air dissolved in the ink is arranged in the ink flow path from the deaerator 62 to the print heads 12K, 12C, 12M and 12Y, and the measurement value from the dissolved oxygen meter 63 is monitored. The control is implemented to change the deaerating section in such a manner that the amount of air dissolved in the ink is within a prescribed range.

In particular, when the power supply for the inkjet recording apparatus 10 is switched on, the print heads 12K, 12C, 12M and 12Y and the ink flow paths contain ink in which the amount of dissolved air has not been controlled. It is hence necessary to cycle the ink through the circulatory path (not shown) for a prescribed period of time, and to supply ink having a controlled amount of dissolved air to the print heads 12K, 12C, 12M and 12Y and the ink flow paths. Desirably, the dissolved oxygen meter 63 arranged in the flow path is monitored, and the ink is cycled until the measured amount of dissolved air comes within a predetermined range.

Figure 7:
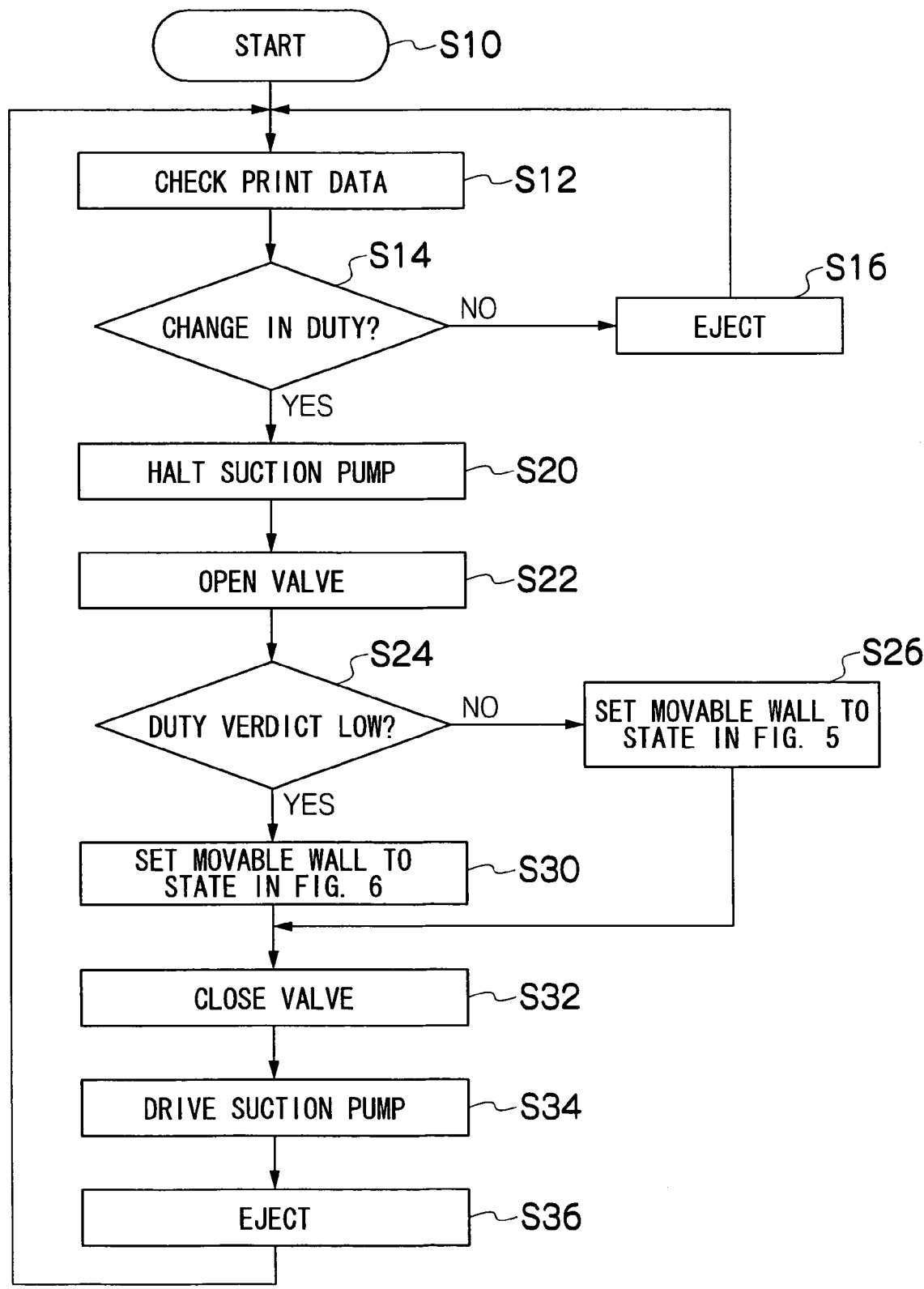
FIG. 7 is a flowchart showing the sequence of deaeration control in the deaerator according to the present embodiment.

FIG. 7 is a flowchart showing the sequence of deaeration control in the inkjet recording apparatus 10. To make the present embodiment more readily understood, it is assumed in FIG. 7 that: the deaerator 62 has two chambers 100 and 102; it is judged whether or not the ejection duty of the print heads 12K, 12C, 12M and 12Y is high duty or low duty; and the deaerator 62 is accordingly controlled so as to perform deaeration by means of the chamber 100 only, or to perform deaeration by means of the two chambers 100 and 102.

When the printing control sequence starts (step S10), the print data is checked and the ink ejection duty of the print heads 12K, 12C, 12M and 12Y is determined from the print data (step S12).

The ejection duty thereby determined is compared with the ejection duty thus far (step S14), and if the ejection duty has not changed (NO verdict), then ink is ejected from the print heads 12K, 12C, 12M and 12Y (step S16) and an image is formed on the recording paper 16.

If, on the other hand, the ejection duty has changed at step S14 (YES verdict), then the suction pump 64 is halted (step S20), the external air valve 65 is opened (step S22) and the sequence advances to step S24 at which the ejection duty is judged.

If the ejection duty is judged to be high duty at step S24 (NO verdict), then the movable wall 110 is set to the state shown in FIG. 5 (step S26). Then, the external air valve 65 is closed (step S32), the suction pump 64 is turned on and deaeration of the ink inside the chambers 100 and 102 is carried out (step S34). The deaerated ink is supplied to the print heads 12K, 12C, 12M and 12Y and is ejected from the print heads 12K, 12C, 12M and 12Y (step S36), then the control sequence returns to step S12.

If, on the other hand, the ejection duty is judged to be low duty at step S24 (YES verdict), then the movable wall 110 is set to the state shown in FIG. 6 (step S30), and the sequence then advances to step S32.

The print data check at step S12 may be performed for each image (print), or for each print lot. Furthermore, it may also be performed at uniform time intervals.

For example, continuous image printing may be judged to be high duty, and intermittent image printing may be judged to be low duty.

The amount of ink ejected per unit time is taken as the ejection duty of the print heads 12K, 12C, 12M and 12Y, which is the parameter used for changing the deaerating section, in the above-described embodiments; however, for the ejection duty, it is also possible to use the number of nozzles operated per unit time, the ejection frequency per unit time, the nozzle operating time per unit time, the speed of the ink flow, or the like.

Furthermore, it is also possible to adjust the deaerating section of the deaerator 62 in accordance with the width or size of the recording paper 16 and/or the size of the printed image.

If three or more chambers are connected together as shown in FIG. 4, then the ejection duty of the print heads 12K, 12C, 12M and 12Y is set in multiple steps, and the number of chambers connected together should be varied accordingly.

For example, if all of the nozzles are being used (i.e., if the ejection duty is 100%), then all the chambers are connected together and the whole region of the deaerator is used as the deaerating section. Moreover, if 50% of the nozzles are being used (i.e., if the ejection duty is 50%), then half the total number of chambers are connected together and 50% of the whole region of the deaerator is used as the deaerating section. Furthermore, if 20% of the nozzles are being used, then 20% of the chambers are connected together and 20% of the whole region of the deaerator is used as the deaerating section.

In other words, if five chambers having ink flow paths of approximately the same length are provided, then it is possible to set the deaerating section in steps of 20%, whereas if ten chambers having ink flow paths of approximately the same length are provided, then it is possible to set the deaerating section in steps of 10%. The ink flow paths in the respective chambers may have approximately the same length or they may have different lengths.

In this way, the deaerating section in the deaerator 62 is optimized in accordance with the operating duty of the print heads 12K, 12C, 12M and 12Y.

Figure 8:
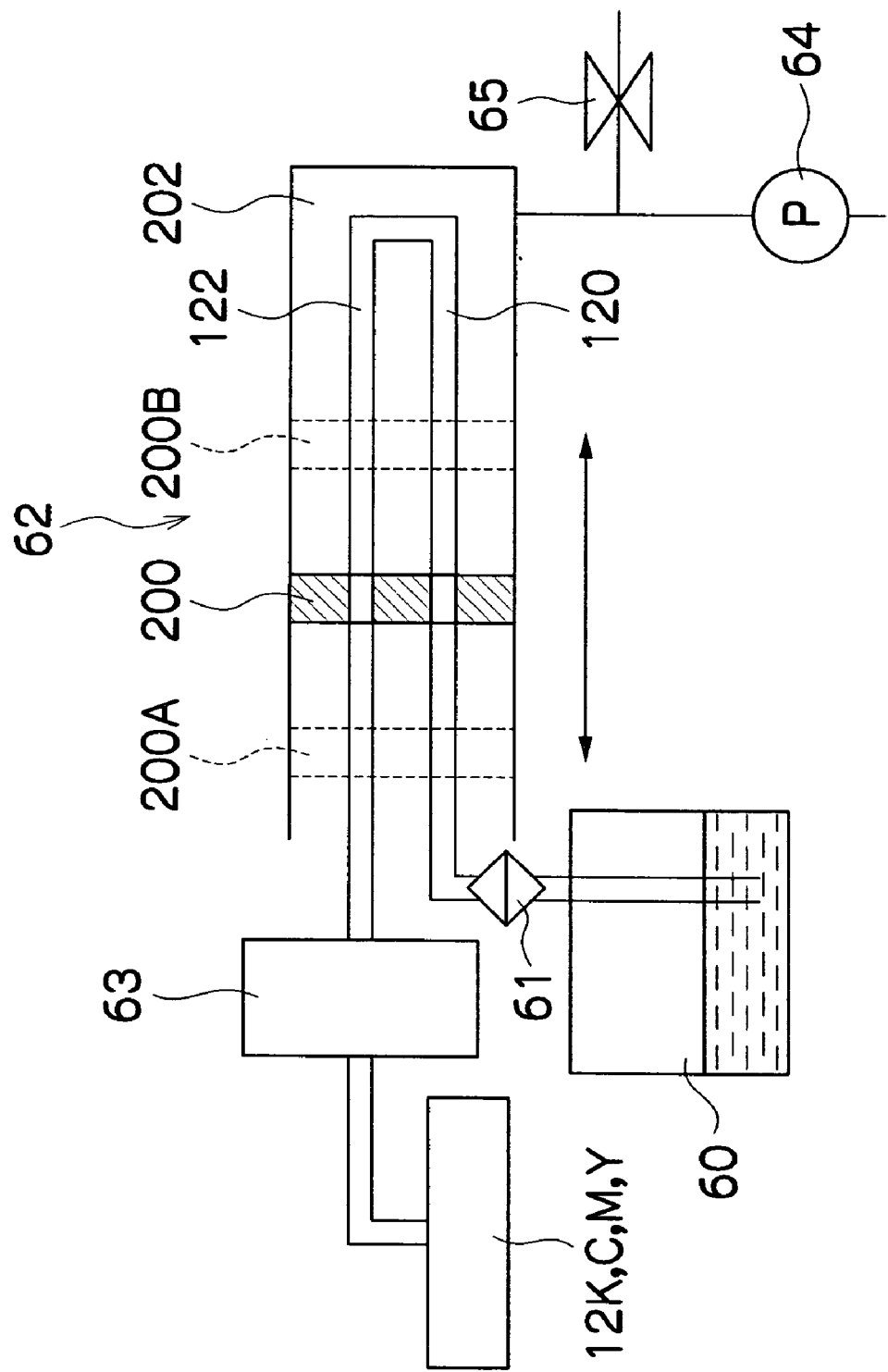
FIG. 8 is a diagram showing a modification of the deaerator according to the present embodiment.

Next, a modification of the deaerator 62 according to the present embodiment is described. FIG. 8 is a general schematic drawing of the deaerator 62 according to this modification. In FIG. 8, items which are the same as or similar to those in FIG. 4 are denoted with the same reference numerals and description thereof is omitted here.

The deaerator 62 includes a chamber 202, which has a movable wall 200 that is movable within a range from the front end to the rear end of the chamber 202, substantially in parallel with the supply flow path 120 and the return flow path 122. The chamber 202 is capable of changing the deaerating section by means of the movable wall 200.

The deaerator 62 further includes a movable wall movement mechanism (not shown) for moving the movable wall 200 reciprocally in the directions of the two-headed arrow in FIG. 8. The movable wall movement mechanism has a mechanical system, such as a ball screw or linear guide, an electrical system, such as a motor or actuator, and a position determination sensor, and the like.

In the case of high-duty operation, the movable wall 200 is moved in the direction of the front end side of the chamber 202 (for example, to the position 200A shown by the broken line), which is on the ink supply side from the ink tank 60 and the ink output side to the print heads 12K, 12C, 12M and 12Y. In the case of low-duty operation, the movable wall 200 is moved in the direction of the rear end side, which is opposite to the front end side (for example, to the position 200B shown by the broken line).

More specifically, if the movable wall 200 is moved to the front end side of the chamber 202, then the deaerating section can be enlarged, and hence it is possible to increase the amount of ink that can be deaerated per unit time. On the other hand, if the movable wall 200 is moved to the rear end side of the chamber 202, then the deaerating section can be reduced, and hence it is possible to reduce the amount of ink that can be deaerated per unit time.

Since the movable wall 200 can move continuously within the chamber 202, it is possible to change the size of the deaerating section continuously.

In the inkjet recording apparatus 10 having the composition described above, the size of the deaerating section can be adjusted by varying the length of the ink flow path inside the deaerator in accordance with the amount of ink consumed per unit time. Therefore, an optimal deaerating section can be prepared even in the case of intermittent printing or low-duty printing. Accordingly, energy savings can be made during intermittent printing or low-duty printing, and furthermore, excessive deaeration of the ink can be prevented. Moreover, it is possible to optimize the ink supply path from the ink bottles (ink tank 60) to the print heads 12K, 12C, 12M and 12Y.

More specifically, the deaerator 62 is provided with a plurality of chambers 100, 102, and the like, divided by movable walls 110, 112, and the like, having connecting flow paths 140 and 142 and a U-shaped flow path 160, and by moving the movable wall 110, it is possible to connect the supply flow paths and return flow paths of adjoining chambers by means of the connecting flow paths 140 and 142, during continuous printing or high-duty printing. In this way, the deaerating section can be enlarged, and hence the amount of ink that can be deaerated per unit time can be increased. On the other hand, during intermittent printing or low-duty printing, the supply flow path and the return flow path of the same chamber can be connected by means of the U-shaped flow path 160. Consequently, the length of the ink flow path inside the deaerator 62 is reduced and hence unnecessary deaeration is avoided. This prevents excessive deaeration and contributes towards saving energy.

In the present embodiments, a deaerator 62 used in an inkjet recording apparatus 10 has been described as an example; however, the scope of application of the present invention is not limited to this, and it may also be applied to a deaerator used in an analyzing apparatus such as a chromatographer, to perform deaeration around a region subject to analysis by reducing to vacuum conditions.

Furthermore, the present invention may also be applied to a liquid ejecting device other than an inkjet recording apparatus, such as a device for ejecting a liquid such as water, processing liquid, or chemical, onto an ejection receiving medium from nozzles provided in an ejection head.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A deaerator for liquid, comprising:
   a flow path in which the liquid flows;
   a pressure reducing deaerating device which removes dissolved gas contained in the liquid inside the flow path by reducing pressure of a deaerating section surrounding at least a portion of the flow path;
   a variation device which varies a length of the flow path inside the deaerating section; and
   a control device which performs control so that an effective region of the deaerating section is enlarged in such a manner that the length of the flow path inside the deaerating section becomes relatively longer when a use frequency of the deaerated liquid is relatively high, and the effective region of the deaerating section is reduced in such a manner that the length of the flow path inside deaerating section becomes relatively shorter when the use frequency of the deaerated liquid is relatively low.

2. The deaerator as defined in claim 1, further comprising a dividing member which divides the deaerating section into a plurality of chambers, the dividing member having a flow path switching device which switches a flow of the liquid so as to change the flow path formed inside the deaerating section and thereby causes the length of the flow path inside the deaerating section to vary.

3. The deaerator as defined in claim 2, wherein:

the flow path inside the deaerating section has a structure in which a supply flow path entering from an inlet of the deaerating section turns back and changes to a return flow path which returns to a side of the inlet;

the dividing member comprises connecting pipes which connect the supply flow paths and the return flow paths, respectively, of the chambers divided by the dividing member, and a turn back pipe which connects the supply flow path and the return flow path inside the same chamber; and a control device performs control so that the length of the flow path inside the deaerating section is varied through switching between the connecting pipes and the turn back pipe, by moving the dividing member.

4. The deaerator as defined in claim 3, wherein:

the dividing member has a connecting hole which connects the chambers divided by the dividing member; and the pressure reducing deaerating device reduces the pressure inside the chambers connected through the connecting hole when the connecting pipes are set in position by movement of the dividing member.

5. The deaerator as defined in claim 1, further comprising:

an attaching and detaching device which attaches and detaches each of chambers arranged in the deaerating section, wherein the length of the flow path inside the deaerating section is varied by increasing or decreasing a number of the chambers by the attaching and detaching device.

6. The deaerator as defined in claim 1, further comprising a movable wall which moves by sliding along the flow path contained in the deaerating section to vary the length of the flow path inside the deaerating section.

7. The deaerator as defined in claim 6, wherein the flow path contained inside the deaerating section comprises a supply flow path and a return flow path disposed substantially in parallel inside the deaerating section.

8. A liquid ejecting device, comprising:

an ejection head which ejects droplets of liquid onto an ejection receiving medium;

a storing section which stores the liquid to be ejected from the ejection head;

a flow path which supplies the liquid to the ejection head from the storing section; and the deaerator as defined in claim 1 which removes dissolved gas contained in the liquid inside the flow path.

9. An inkjet recording apparatus, comprising:

a recording head which ejects droplets of ink onto a recording medium;

an ink storing section which stores the ink to be ejected from the recording head;

an ink flow path which supplies the ink from the ink storing section to the recording head; and the deaerator as defined in claim 1 which removes dissolved gas contained in the ink inside the ink flow path.

* * * * *